US012309321B2

(12) United States Patent
Paiuk

(10) Patent No.: US 12,309,321 B2
(45) Date of Patent: May 20, 2025

(54) PROGRAMMABLE CONTACT CENTER DEVICE

(71) Applicant: Zoom Communications, Inc., San Jose, CA (US)

(72) Inventor: Alejandro Paiuk, West Hartford, CT (US)

(73) Assignee: Zoom Communications, Inc., San Jose, CA (US)

( * ) Notice: Subject to any disclaimer, the term of this patent is extended or adjusted under 35 U.S.C. 154(b) by 279 days.

(21) Appl. No.: 18/156,500

(22) Filed: Jan. 19, 2023

(65) Prior Publication Data

US 2024/0251037 A1 Jul. 25, 2024

(51) Int. Cl.
*H04M 3/00* (2024.01)
*G06F 9/451* (2018.01)
*H04M 3/51* (2006.01)

(52) U.S. Cl.
CPC .......... *H04M 3/5183* (2013.01); *G06F 9/453* (2018.02)

(58) Field of Classification Search
CPC ............................ H04M 3/5183; G06F 9/453
USPC ....... 379/265.01–265.14, 266.01–266.1, 309
See application file for complete search history.

(56) References Cited

U.S. PATENT DOCUMENTS

| | | | |
|---|---|---|---|
| 6,934,380 B2 | 8/2005 | Shaffer et al. | |
| 7,710,947 B2 | 5/2010 | McRae | |
| 7,739,340 B2 | 6/2010 | Arenburg et al. | |
| 9,118,763 B1 | 8/2015 | Margulies et al. | |
| 9,772,933 B1* | 9/2017 | Edrey | G06F 11/3692 |
| 10,003,691 B1* | 6/2018 | Agarwa | H04M 3/42153 |
| 10,101,974 B2 | 10/2018 | Ristock et al. | |
| 10,705,679 B1 | 7/2020 | Galvan et al. | |
| 2009/0217180 A1 | 8/2009 | Tovino et al. | |
| 2013/0090963 A1* | 4/2013 | Sharma | G06Q 10/063112 705/7.13 |
| 2018/0091647 A1* | 3/2018 | Elizondo | H04M 3/5175 |
| 2019/0171770 A1* | 6/2019 | Walker | G06F 40/154 |
| 2019/0361682 A1* | 11/2019 | Cavalcante | G06F 8/38 |
| 2021/0185173 A1* | 6/2021 | Kadakia | H04M 3/5183 |

* cited by examiner

*Primary Examiner* — William J Deane, Jr.
(74) *Attorney, Agent, or Firm* — Young Basile Hanlon & MacFarlane, P.C.

(57) ABSTRACT

A system may assign a set of one or more actions to a programmable button of a contact center device connected to an agent device of a contact center agent. The set of one or more actions may correspond to a workflow associated with a contact center engagement between a contact center user and the contact center agent. The set of one or more actions may be assigned based on at least one of activating the contact center device or connecting the contact center device to a network. The system may initiate, based on a selection of the programmable button, the workflow by transmitting, from the contact center device to the agent device, information configured to cause the agent device to perform the set of one or more actions.

20 Claims, 10 Drawing Sheets

PROGRAMMABLE CONTACT CENTER DEVICE

FIELD

This disclosure relates generally to contact centers and, more specifically, to a programmable contact center device.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION OF THE DRAWINGS

Figure 1:
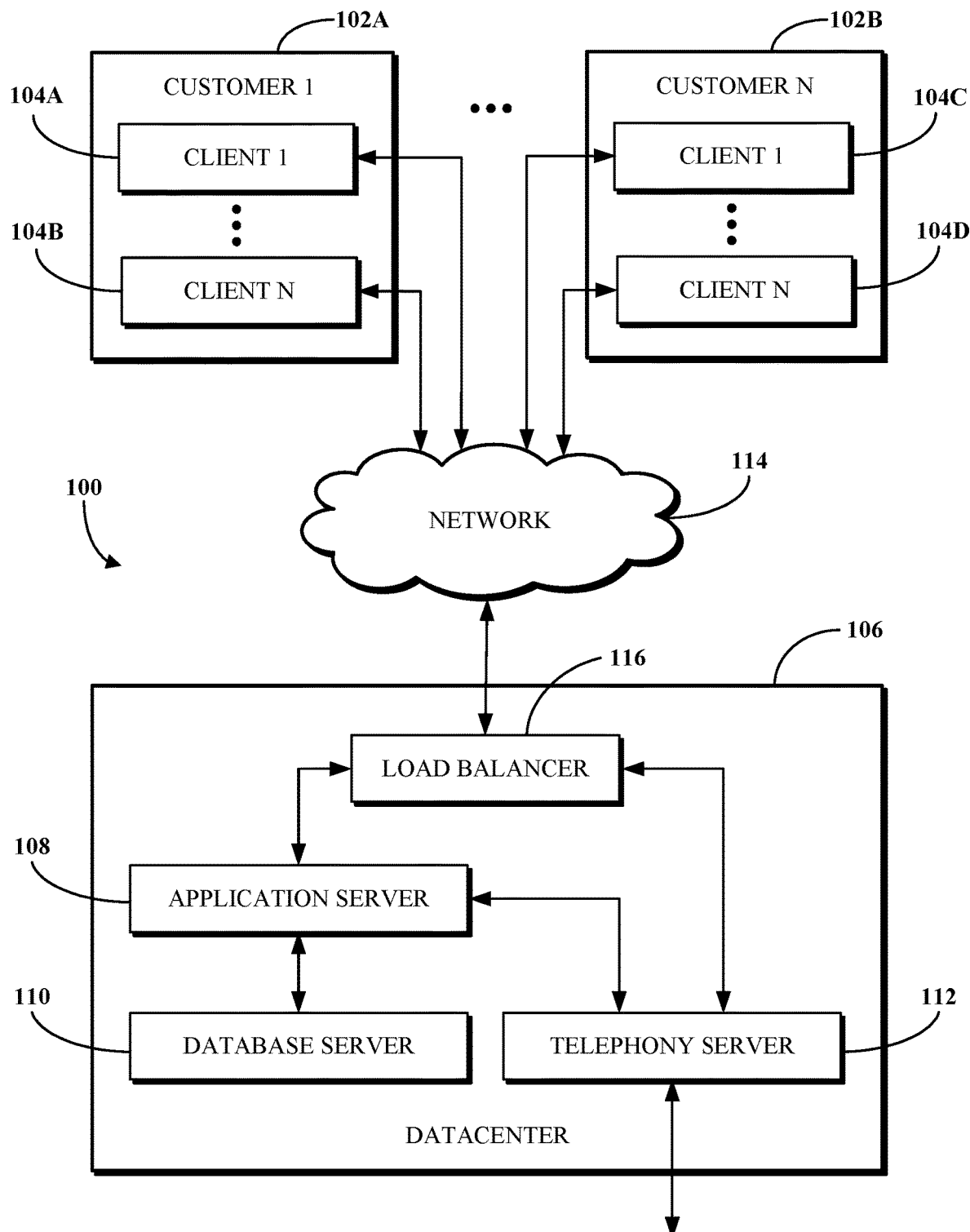
FIG. 1 is a block diagram of an example of an electronic computing and communications system.

The use of contact centers by or for service providers is becoming increasingly common to address customer support requests over various modalities, including telephony, video, text messaging, chat, and social media. In one example, a contact center may be implemented by or otherwise in connection with a software platform, such as a unified communications as a service (UCaaS) platform, for a customer of the software platform. Users of the customer may engage with the contact center to address support requests over one or more communication modalities enabled for use with the contact center by the software platform. In another example, an operator of such a software platform may implement a contact center to address customer support requests related to the software platform itself. During a contact center engagement between a contact center user and a contact center agent, the agent may have to perform multiple actions as part of a workflow related to the engagement. For example, the agent may have to navigate menus, select icons, and input information in different ways to accomplish various workflows, such as initiating payment transactions, transferring calls, accessing customer or knowledgebase records, and transmitting messages. Performing the actions for the various workflows typically involves one or more manual steps, which can take time for the agent to complete, and which thus may result in a loss of efficiency for the agent and the contact center. In some cases, contact center agents who are not familiar with certain workflows may require help from another agent or a supervisor to proceed, thereby delaying the support request service to the user even more. Further, it is possible that different agents may perform the actions differently from one another, which inconsistencies may also result in a loss of team efficiency and/or a reduction in user satisfaction.

Implementations of this disclosure address problems such as these by implementing a physical, electronic contact center device that runs contact center administrative software to assign actions to one or more programmable buttons or keys to complete a workflow. The contact center device may include a processor, a memory, a power interface, a network interface, a communications interface, and the one or more programmable buttons. In some implementations, the contact center device may include a controller, such as a joystick. The contact center device may receive power through the power interface, connect to a network through the network interface (e.g., a wired or wireless local area network (LAN) connection), and connect to a physical, electronic agent device (e.g., a computing device used by a contact center agent to directly communicate with contact center users during contact center engagements) through the communications interface (e.g., a wired or wireless universal serial bus (USB) connection). The agent device could be a workstation (e.g., a desktop or laptop computer) running contact center software to support contact center engagements between contact center users and the agent. In some implementations, the contact center device may be virtual. For example, the contact center device could be implemented by a digital representation shown graphically via the agent device. In some implementations, the contact center device may be integrated with the agent device. For example, the contact center device and the agent device could appear as a single device to the agent. In some implementations, the contact center device may be used by the agent as the agent device. For example, the agent could use the contact center device to interact with contact center users during contact center engagements.

The contact center device and the agent device can be used together to improve contact center engagements. The administrative software may assign a set of one or more actions to a programmable button of the contact center device. The set of one or more actions may correspond to a workflow associated with a contact center engagement (e.g., initiating payment transactions, transferring calls, or transmitting messages). In some implementations, the administrative software may assign the set of one or more actions based on activating the contact center device (e.g., the administrative software may run automatically when the contact center device is powered on via the power interface). In some implementations, the administrative software may assign the set of one or more actions based on connecting the contact center device to a network (e.g., the administrative software may run remotely to assign the set of one or more actions when the contact center device is connected to an administrator device via the network interface). The administrative software may initiate the workflow based on a selection of the programmable button (e.g., by the agent pressing the button). The administrative software may initiate the workflow by transmitting information from the contact center device to the agent device. The information may be configured to cause the agent device to perform the set of one or more actions (e.g., commands). For example, the set of one or more actions may include selecting applications, opening windows, extracting information from data sources, inputting information in fields, and controlling hardware associated with the agent device (e.g., phones, lights, cameras, monitors, microphones, and speakers). As a result, the contact center device may improve the efficiency of contact center engagements.

To describe some implementations in greater detail, reference is first made to examples of hardware and software structures used to implement a programmable contact center device. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106. For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
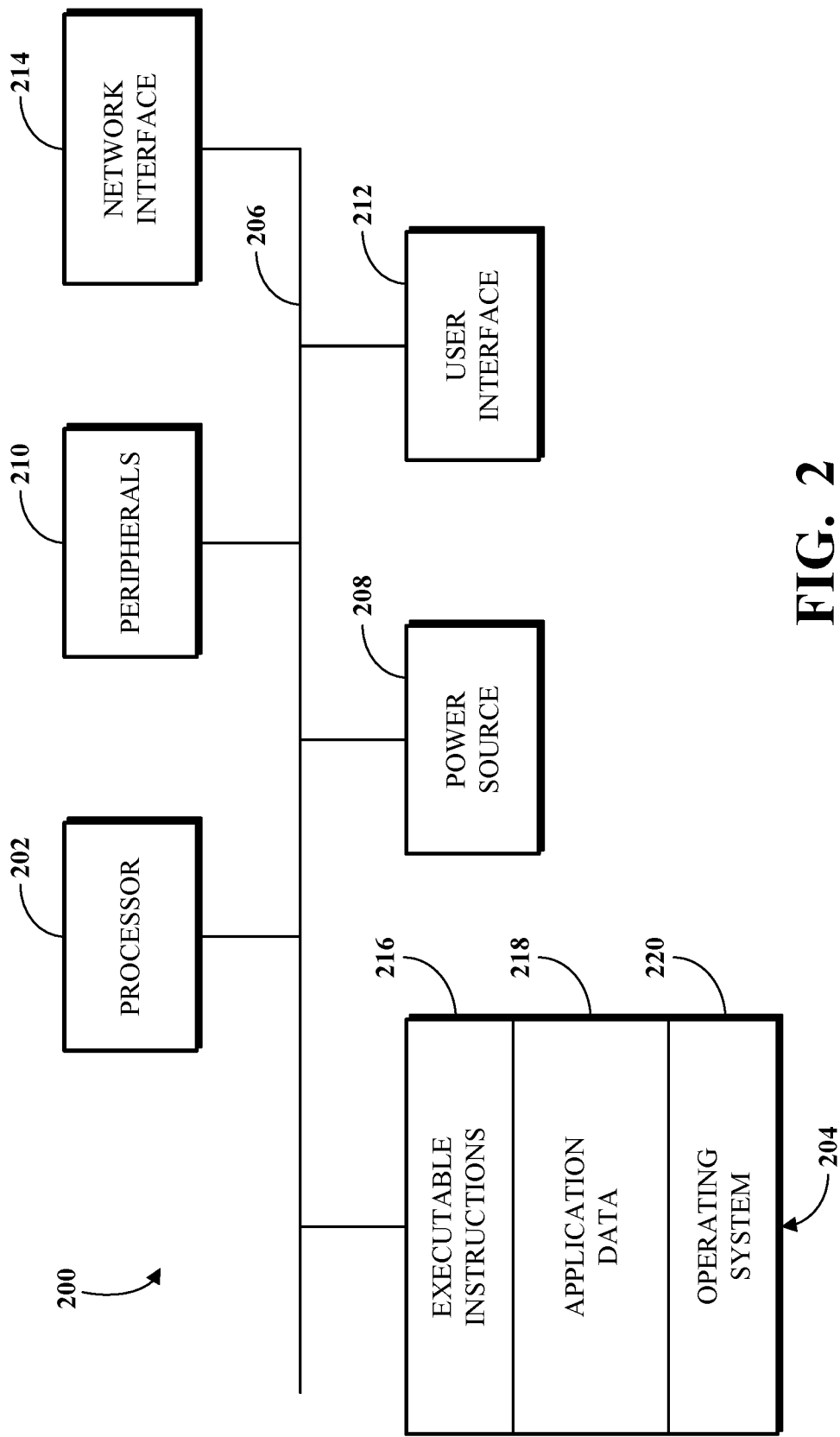
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR DRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may for example, be a positional input device, such as a mouse, touchpad, touchscreen, or the like; a keyboard; or another suitable human or machine interface device. An output interface may for example, be a display, such as a liquid crystal display, a cathode-ray tube, a light emitting diode display, virtual reality display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
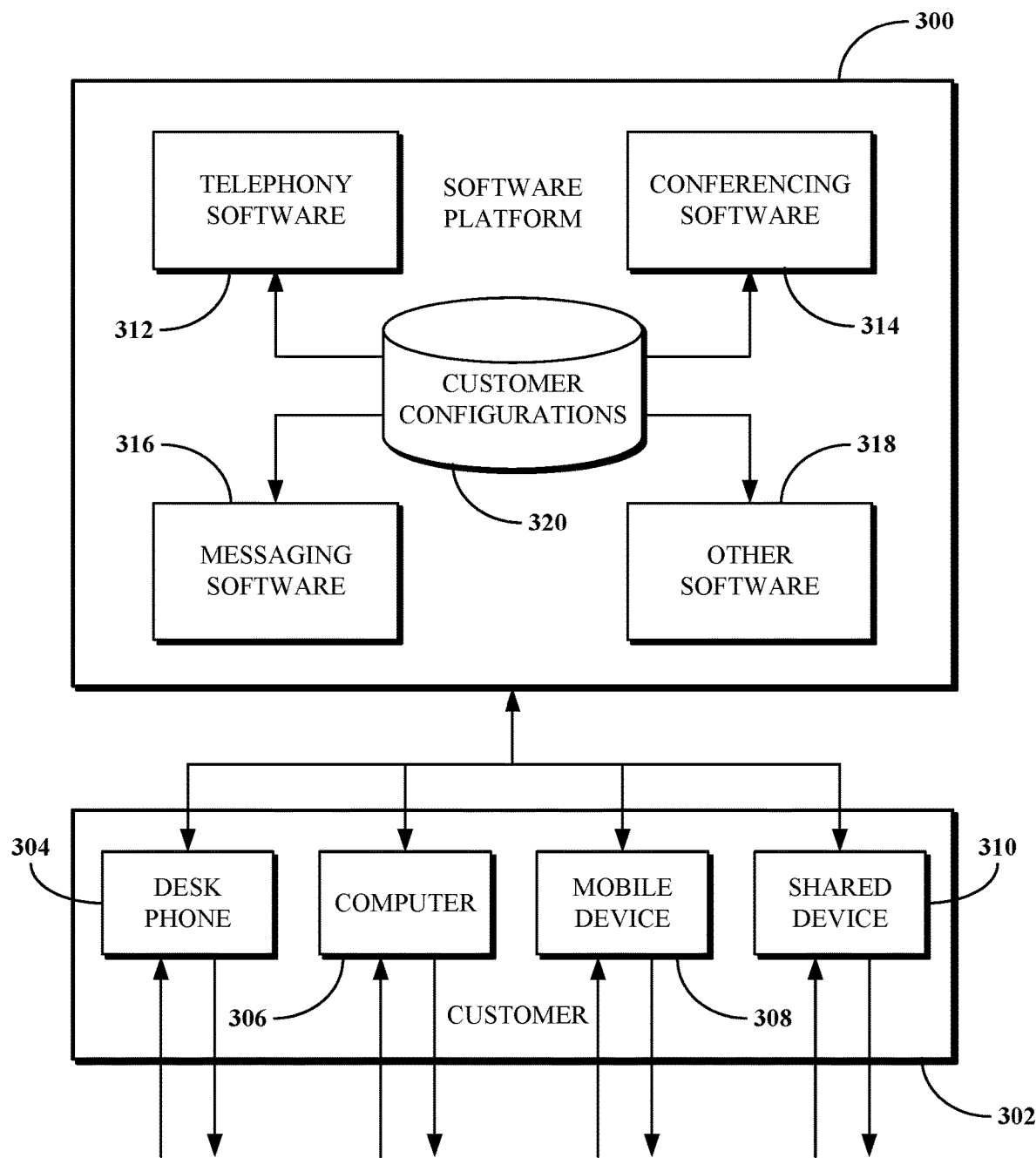
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

In some implementations, the computer 306 could be an agent device in a contact center system, and the shared device 310 could be a programmable contact center device.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for use with a contact center system, for example, communication software for enabling communication between an agent device and a user device and/or administrative software for configuring a programmable contact center device.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some, or all, of the software 312 through 318 may be combined into a single software application run on clients of the customer, such as one or more of the clients 304 through 310.

Figure 4:
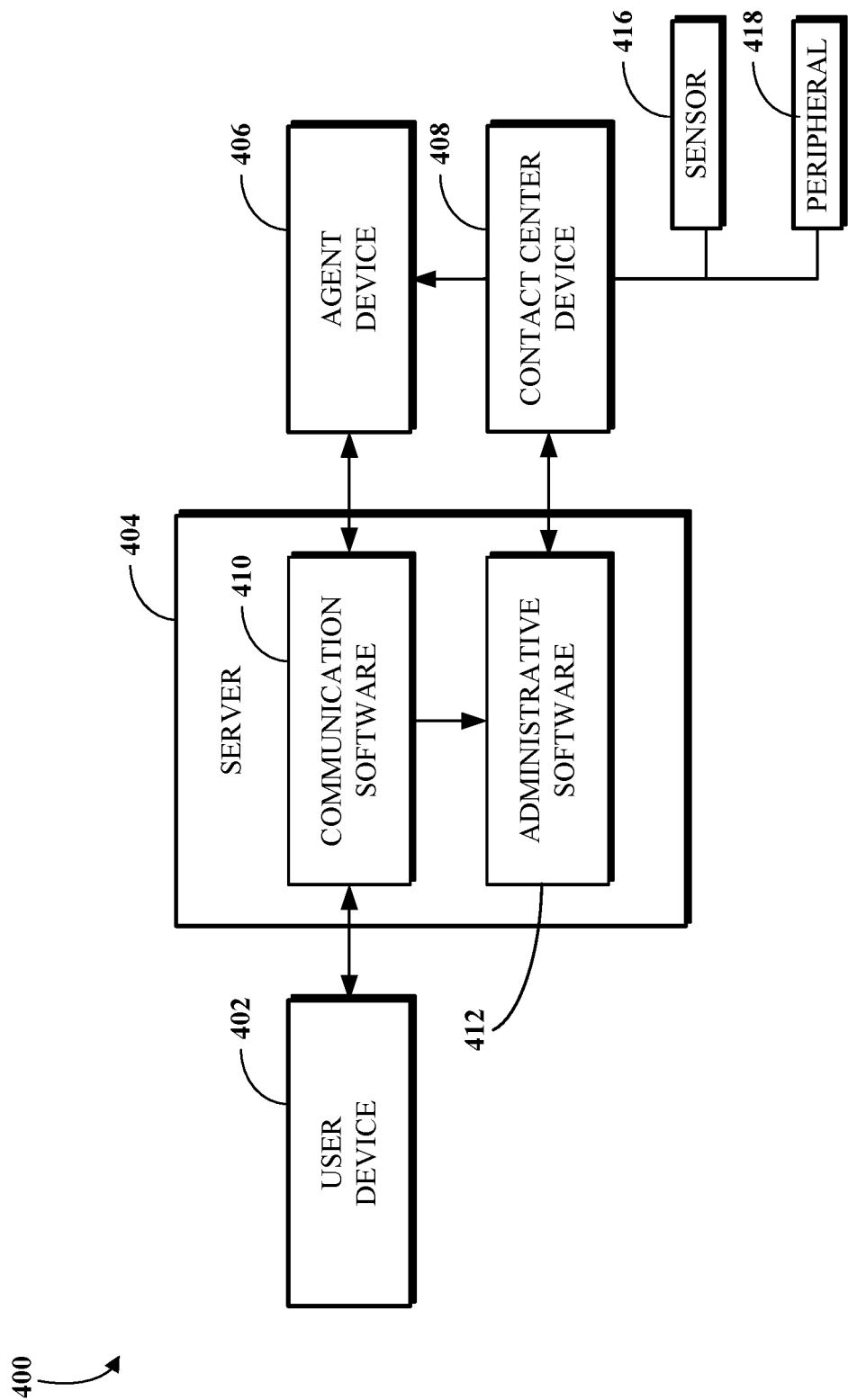
FIG. 4 is a block diagram of an example of a contact center system including a programmable contact center device having a programmable button.

FIG. 4 is a block diagram of an example of a contact center system 400. The contact center system 400 may include a user device 402, a server 404, an agent device 406, and a contact center device 408 that is programmable (e.g., having one or more programmable buttons). The contact center device 408 may be physical device that is connected to the agent device 406 to improve contact center engagements between a user of the user device 402 (e.g., a contact center user using a computer, such as a laptop, notebook, smartphone, or wearable technology) and a contact center agent using the agent device 406 (e.g., an agent using a computer, such as a workstation). The contact center system 400 may be implemented in connection with a software platform (e.g., the software platform 300 shown in FIG. 3).

For example, the server 404 could be implemented using one or more of the servers 108 through 112 shown in FIG. 1, and may use software such as or similar to the software 312 through 318 shown in FIG. 3. The server 404 includes software for facilitating contact center engagements requested by user devices such as the user device 402. As shown, the software includes communication software 410 and administrative software 412.

The communication software 410 is software used to implement a contact center engagement between the contact center user using the user device 402 and the agent using the agent device 406. The particular type of communication software 410 used may be based on the modality for the user request resulting in the contact center engagement. For example, where the user request is for a contact center engagement over the telephony modality, the communication software 410 may be telephony software, such as the telephony software 312 shown in FIG. 3. In another example, where the user request is for a contact center engagement over the video modality, the communication software 410 may be conferencing software, such as the conferencing software 314 shown in FIG. 3.

The administrative software 412 is software used to assign a set of one or more actions to the programmable button of the contact center device 408. In this example, the administrative software 412 may run remotely relative to the contact center device 408 (e.g., the administrative software 412 may run on the server 404). For example, the administrative software 412 may assign the set of one or more actions to the programmable button based on connecting the contact center device 408 to the server 404 (e.g., via a network interface of the contact center device 408, such as the network interface 712 shown in FIG. 7). In other examples, the administrative software 412 may run locally on the contact center device 408 and/or the agent device 406.

The set of one or more actions may correspond to a workflow associated with the contact center engagement. Examples of a workflow to which the set of one or more actions may correspond include, but are not limited to, initiating a payment transaction (e.g., invoking a resource for performing a secure payment), transferring a call (e.g., transferring the user device 402 to another agent device or a supervisor device), or transmitting a message or knowledgebase article to the user device 402. Such a workflow may be initiated or otherwise executed by a selection of a programmable button. For example, for transmitting a knowledgebase article, a specific article may be pulled up for automatic sharing with a user during a contact center engagement by the selection of a programmable button. Further, for transmitting a message, such as a coupon code or web link to a customer review site or a referral site, the message may be generated for automatic sharing with the user during the contact center engagement by the selection of another programmable button. In some implementations, the workflow could include changing a display that is output to one or more monitors associated with the agent device 406. For example, changing the display could enable an agent to efficiently configure a graphical user interface associated with the agent device 406 for a particular contact center engagement. In some implementations, the workflow could include changing a focus of a camera associated with the agent device 406, or changing a video feed, transmitted to the user device 402, from a first camera associated with the agent device 406 to a second camera associated with the agent device 406. For example, changing the focus of the camera or the video feed from the first camera to the second camera could enable an agent to share different views with the contact center user, such as a first view of the agent and a second view of a product or service being performed.

The administrative software 412 may configure the programmable button so that the workflow is initiated based on a selection of the programmable button (e.g., the agent pressing the programmable button). Initiating the workflow may include transmitting information from the contact center device 408 to the agent device 406 (e.g., via a communications interface of the contact center device 408). The information may be configured to cause the agent device 406 to perform the set of one or more actions (e.g., commands to the agent device 406). For example, the set of one or more actions may include commands that cause the agent device 406 to select applications, open windows, extract information from data sources, input information in fields, and control other hardware associated with the agent device 406 (e.g., phones, lights, cameras, monitors, microphones, and speakers, such as for use a presence indicator). In some implementations, an application program interfaces (API) of the agent device 406 may be used to communicate the commands from the contact center device 408 to one or more applications of the agent device 406. As a result, the contact center device 408 may improve the efficiency of contact center engagements.

In some implementations, the contact center device 408 may require authentication of a login credential before configuring a programmable button and/or enabling a programmable button to initiate a workflow. The login credential may be connected to the agent using the agent device 406. For example, the login credential could be encoded on an access card which could be inserted by the agent into an access port of the contact center device 408. In another example, the login credential could be entered by the agent via keys or a touch display of the contact center device 408. Authenticating the login credential may enable configuring the programmable button (e.g., customization) and/or enable using the programmable button to initiate a workflow. In some implementations, the contact center device 408 may enable biometric authentication for the login credential. For example, the contact center device 408 may include a sensor configured to receive biometric information, such as voice sample, fingerprint, facial feature, or eye feature, for the login credential.

In some implementations, the contact center device 408 may be virtual. For example, the contact center device 408 could be implemented by a digital representation shown graphically via the agent device 406. In some implementations, the contact center device 408 may be integrated with the agent device 406. For example, the contact center device 408 and the agent device 406 could appear as a single device to the agent. In some implementations, the contact center device 408 may be used by the agent as the agent device 406. For example, the agent could use the contact center device to interact with contact center users during contact center engagements In some implementations, the contact center device 408 may enable automated detection of agent presence. For example, a sensor 416 may be connected to the contact center device 408 to detect whether the agent is in proximity to the contact center device 408 (e.g., at a designated station). The sensor 416 could be, for example, a pressure sensor, a camera, or other sensor for detecting agent presence. The contact center device 408 can then communicate with another device, such as the server 404 or a peripheral 418, to transmit agent presence. For example, the contact center device 408 could transmit data for system alerts, reports, and real-time telemetry associated with presence to the server 404, and/or transmit agent a signal associated with presence to the peripheral 418, which could be a colored light attached to the top of a cubicle at an on-premises contact center (e.g., a green light indicating presence).

Figure 5:
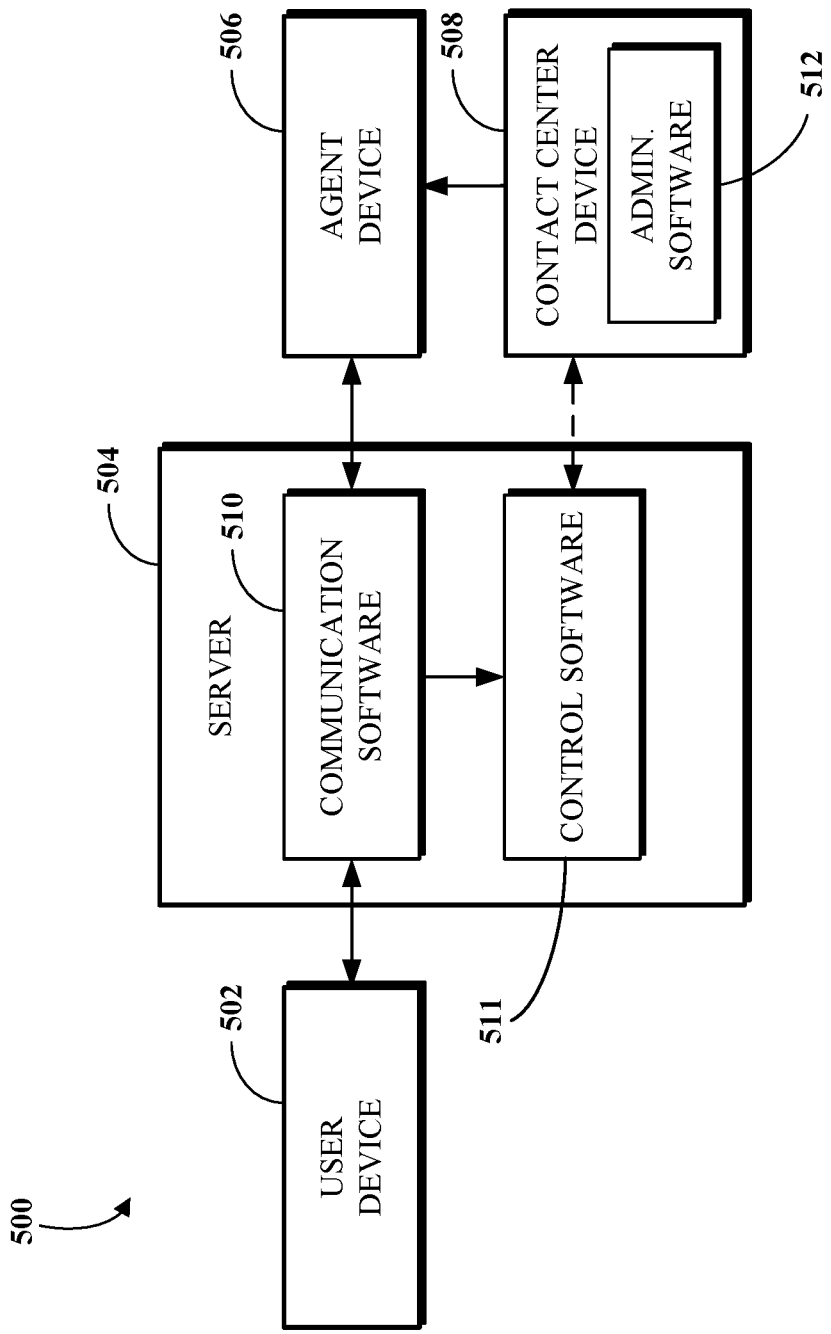
FIG. 5 is a block diagram of another example of a contact center system including a programmable contact center device.

FIG. 5 is a block diagram of an example of a contact center system 500. The contact center system 500 may include a user device 502, a server 504, an agent device 506, and a contact center device 508 that is programmable. The contact center device 508 may be physical device that is connected to the agent device 506 to improve contact center engagements between a user of the user device 502 (a contact center user) and a contact center agent using the agent device 506 (an agent). The contact center system 500 may be implemented in connection with a software platform (e.g., the software platform 300 shown in FIG. 3). For example, the server 504 could be implemented using one or more of the servers 108 through 112 shown in FIG. 1, and may use software such as or similar to the software 312 through 318 shown in FIG. 3. The server 504 includes software for facilitating contact center engagements requested by user devices such as the user device 502. As shown, the software includes communication software 510 and control software 511.

The communication software 510 may be like the communication software 410 shown in FIG. 4. In this example, the contact center device 508 includes administrative software 512 like the administrative software 412 shown in FIG. 4. The administrative software 512 is software used to assign a set of one or more actions to the programmable button of the contact center device 508. The administrative software 512 may run locally on the contact center device 508. For example, the administrative software 512 may assign the set of one or more actions to the programmable button based on activating the contact center device 508 (e.g., via a power interface and/or a power button of the contact center device 508, such as the power interface 710 and/or the power button 708 shown in FIG. 7, with or without a connection to the server 504). In some implementations, the contact center device 508 may optionally connect to the server 504 to update the administrative software 512 and/or authenticate the administrative software 512. For example, the contact center device 508 may connect to the server 504 via a network interface of the contact center device 508 (e.g., the network interface 712 shown in FIG. 7). When connected, the control software 511 may update the administrative software 512 and/or authenticate the administrative software 512 to enable its use (e.g., to enable configuring the programmable button).

Figure 6:
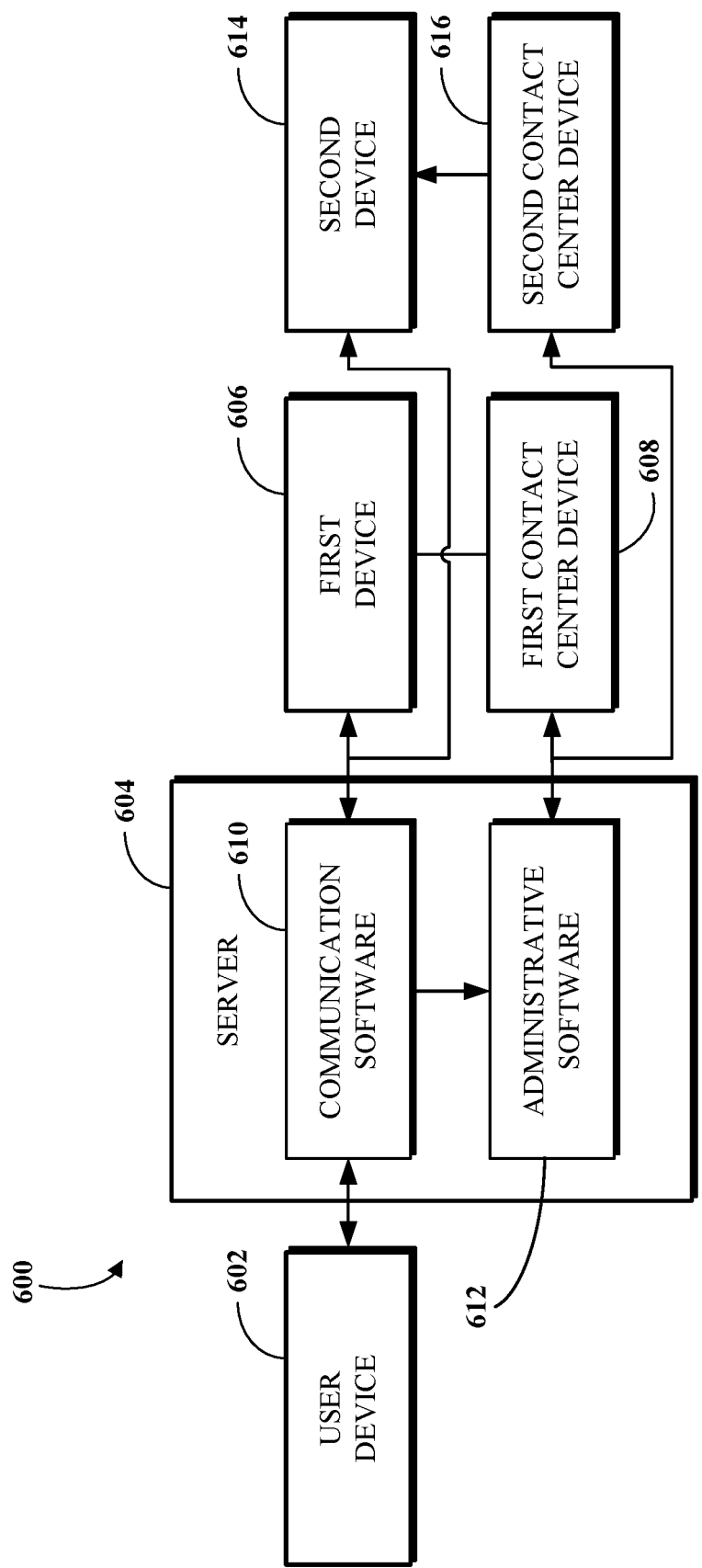
FIG. 6 is a block diagram of an example of a contact center system including multiple contact center devices.

FIG. 6 is a block diagram of an example of a contact center system 600. The contact center system 600 may include a user device 602, a server 604, a first device 606 (e.g., an agent device), a first contact center device 608 that is programmable, a second device 614 (e.g., a supervisor device), and a second contact center device 616 that is programmable. The first contact center device 608 may be physical device that is connected to the first device 606 and the second contact center device 616 may be physical device that is connected to the second device 614. The first contact center device 608 and the second contact center device 616 may be used to improve contact center engagements between a user of the user device 602 (a contact center user) and one or more agents of the contact center, such as a first agent and a second agent, or an agent and a supervisor. The contact center system 600 may be implemented in connection with a software platform (e.g., the software platform 300 shown in FIG. 3). For example, the server 604 could be implemented using one or more of the servers 108 through 112 shown in FIG. 1, and may use software such as or similar to the software 312 through 318 shown in FIG. 3. The server 604 includes software for facilitating contact center engagements requested by user devices such as the user device 602. As shown, the software includes communication software 610 and administrative software 612.

The communication software 610 may be like the communication software 410 shown in FIG. 4. The communication software 610 may enable communication between the first device 606, the second device 614, and the user device 602. In this example, the server 604 includes administrative software 612 like the administrative software 412 shown in FIG. 4. The administrative software 612 is software used to assign a set of one or more actions to the programmable button of the first contact center device 608 and/or the second contact center device 616. The administrative software 612 may run remotely relative to the first contact center device 608 and/or the second contact center device 616 (e.g., the administrative software 612 may run on the server 604). For example, the administrative software 612 may assign sets of one or more actions to programmable buttons based on connecting the first contact center device 608 and/or the second contact center device 616 to the server 604 (e.g., via network interfaces of the contact center devices). In this way, multiple contact center devices may be used in the contact center system 600, each under control of the administrative software 612 implemented by the server 604. In other examples, the administrative software 612 may run locally on the first contact center device 608 and/or the second contact center device 616, like the administrative software 512 shown in FIG. 5. For example, in a hybrid approach, the administrative software 612 may run locally on one contact center device (e.g., the first contact center device 608) while running remotely for another contact center device (e.g., the second contact center device 616).

Figure 7:
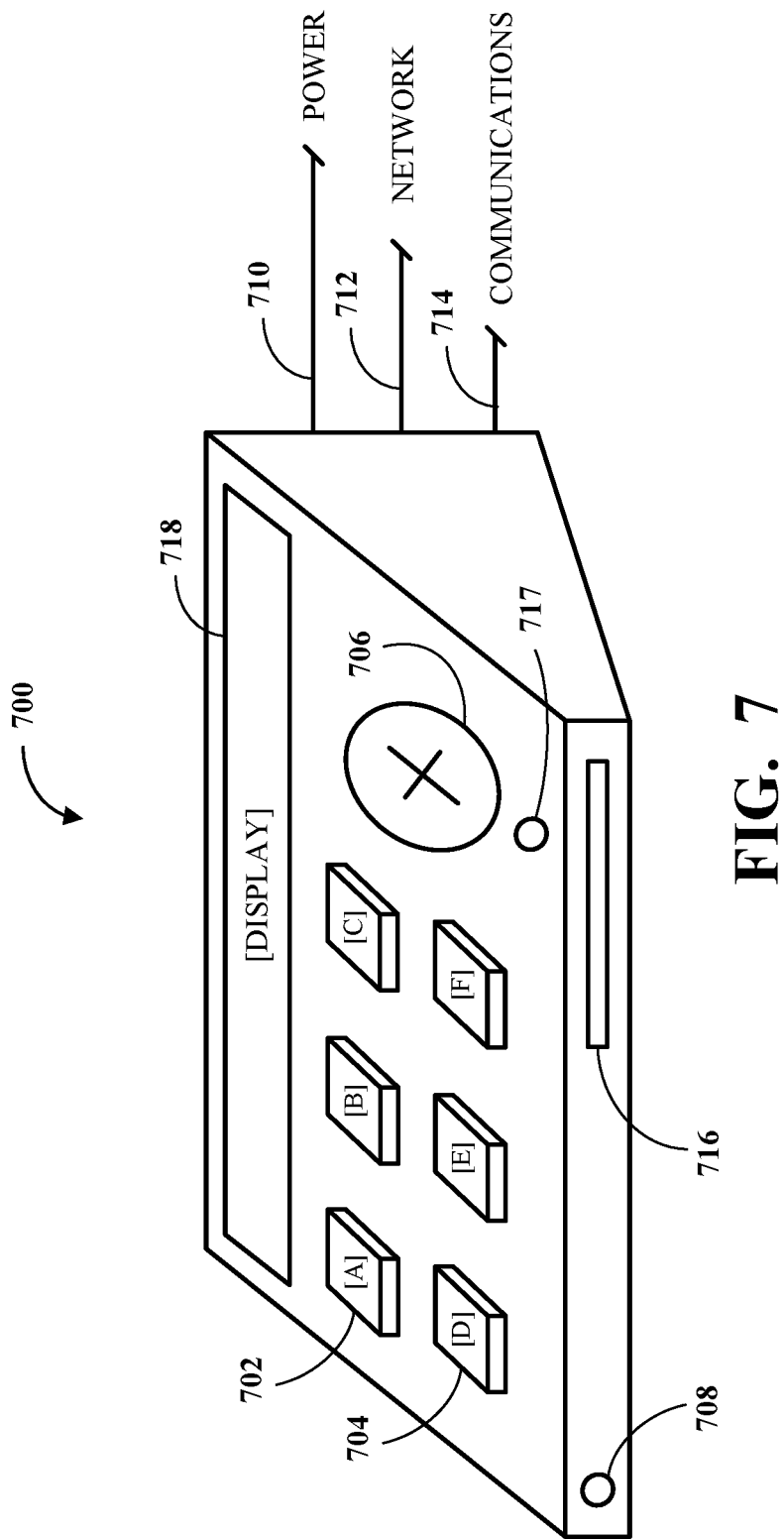
FIG. 7 is an example of a programmable contact center device.

FIG. 7 is an example of a contact center device 700 having programmable buttons, such as a first programmable button 702 and a second programmable button 704. For example, the contact center device 700 could be the contact center device 408 shown in FIG. 4, the contact center device 508 shown in FIG. 5, the first contact center device 608 shown in FIG. 6, or the second contact center device 616 shown in FIG. 6. The contact center device 700 may be connected to an agent device (e.g., the agent device 406, the agent device 506, the first device 606, or the second device 614) to improve contact center engagements.

The contact center device 700 may comprise an enclosure that exposes a set of programmable buttons, including the first programmable button 702 and the second programmable button 704. In some implementations, the set of programmable buttons could be arranged like a number keypad on a keyboard. In some implementations, the contact center device 700 may also include a controller 706, such as a joystick, which the enclosure may also expose. The controller 706 may be used, for example, in connection with focusing a camera and/or operating robotics (e.g., a drone deployed in the field or a bot system) associated with the agent device. The enclosure may house circuitry, such as circuitry implementing a processor, a memory, a display system, and/or wiring between such elements and the programmable buttons and/or the controller 706. For example, the circuitry could implement the computing device 200 shown in FIG. 2.

The display system may be controlled by administrative software (e.g., the administrative software 412, the administrative software 512, or the administrative software 612). The display system may enable an agent or user to control digital labels for the programmable buttons. The digital labels may be configured to display indicators for particular workflows to the user of the contact center device (e.g., the contact center agent). For example, the display system may display a first digital label (e.g., "pay") associated with a first workflow (e.g., initiating payment transactions) to the first programmable button 702, and a second digital label (e.g., "xfer") associated with a second workflow (e.g., transferring calls) to the second programmable button 704. The display system can dynamically change the digital labels. For example, after a conclusion of a first contact center engagement, the display system could change one or more of the digital labels for a second contact center engagement, such as by displaying a third digital label (e.g., "send") associated with a third workflow (e.g., transmitting a message or knowledgebase article to the user device) to the first programmable button 702, and a fourth digital label (e.g., "change") associated with a fourth workflow (e.g., changing a display that is output to one or more monitors associated with the agent device) to the second programmable button 704. In such a case, the digital labels to which the display system changes the previous digital labels may be based on a subject matter or other intention (e.g., purpose) of the second contact center engagement. A conclusion of a contact center engagement may mean that the engagement actually ends (e.g., terminates with the contact center user) or that the agent ceases to be involved, such as due to the engagement being transferred to another agent. In some implementations, the display system may be controlled to light the programmable buttons for particular workflows. For example, the display system may light the first programmable button 702 with a first color (e.g., green) based on a first configuration corresponding to a first workflow (e.g., initiating payment transactions) and light the second programmable button 704 with a second color (e.g., yellow) based on a second configuration corresponding to a second workflow (e.g., changing a display that is output to one or more monitors associated with the agent device).

The contact center device 700 may include a power button 708 for activating the contact center device 700 (e.g., powering on the contact center device 700). The contact center device 700 may also include one or more wired or wireless connection interfaces, such as a power interface 710 for receiving power (e.g., AC power), a network interface 712 for connecting to a server via a network (e.g., the server 404, the server 504, or the server 604), and a communications interface 714 for connecting to an agent device (e.g., the agent device 406, the agent device 506, the first device 606, or the second device 614). In some implementations, the contact center device 700 may be battery powered, with or without the power interface 710. In some implementations, the contact center device 700 may be configured for wired communications with the server and/or the agent device. For example, the network interface 712 could be implemented by an Ethernet connection (e.g., IEEE 802.3) and the communications interface 714 could be implemented by a wired USB or other serial data connection. In some implementations, the contact center device 700 may be configured for wireless communications with the server and/or the agent device. For example, the network interface 712 could be implemented by a wireless network connection (e.g., IEEE 802.11) and the communications interface 714 could be implemented by a wireless USB connection. In some implementations, the power button 708 and/or the power interface 710 may be used to activate the contact center device 700, so that a set of one or more actions can be assigned to the programmable buttons and/or the controller 706. In some implementations, the network interface 712 may be used to connect the contact center device 700 to a network (e.g., the server), so that a set of one or more actions can be assigned to the programmable buttons and/or the controller 706. The communications interface 714 may enable the circuitry of the contact center device 700 to transmit information to the agent device based on a selection of a programmable button and/or the controller 706. The information may be configured to cause the agent device to perform the set of one or more actions assigned to the programmable button and/or the controller 706 (e.g., corresponding to a workflow associated with a contact center engagement).

In some implementations, the contact center device 700 may include an access port 716 for receiving an access card encoded with a login credential. The login credential may be connected to an agent using the agent device to which the contact center device 700 (e.g., via the communications interface 714). The contact center device 700 may include circuitry for analyzing and authenticating or rejecting the login credential. Authentication of the login credential may be required before configuring the programmable buttons and/or the controller 706. Authenticating the login credential may enable configuring the programmable buttons and/or the controller 706 (e.g., customization) and/or enable using the programmable buttons and/or the controller 706 to initiate a workflow. In some cases, the login credential could be entered by an agent via keys or a touch display 718 of the contact center device 408. In some implementations, the contact center device 700 may include a sensor 717 configured to receive biometric information, such as a voice sample, fingerprint, facial feature, or eye feature, for the login credential. For example, the sensor 717 could be a microphone, a camera, or a touch pad.

In some implementations, the display 718 may display information to the agent. For example, the display 718 may display an indication of programming of the programmable button and/or the controller 706. In another example, the display 718 may display an indication of commands that are sent to the agent device based on the selection of a programmable button and/or the controller 706.

In some implementations, one or more of the programmable buttons may be configured by the agent. For example, the first programmable button 702 could be reserved for configuration by the administrative software, while the second programmable button 704 could be reserved for configuration by the agent using the contact center device 700. This may enable a standardization of control over the contact center device 700 for the benefit of efficiency in a contact center (e.g., consistency between agents) while providing flexibility for enhanced control by the agent.

Figure 8:
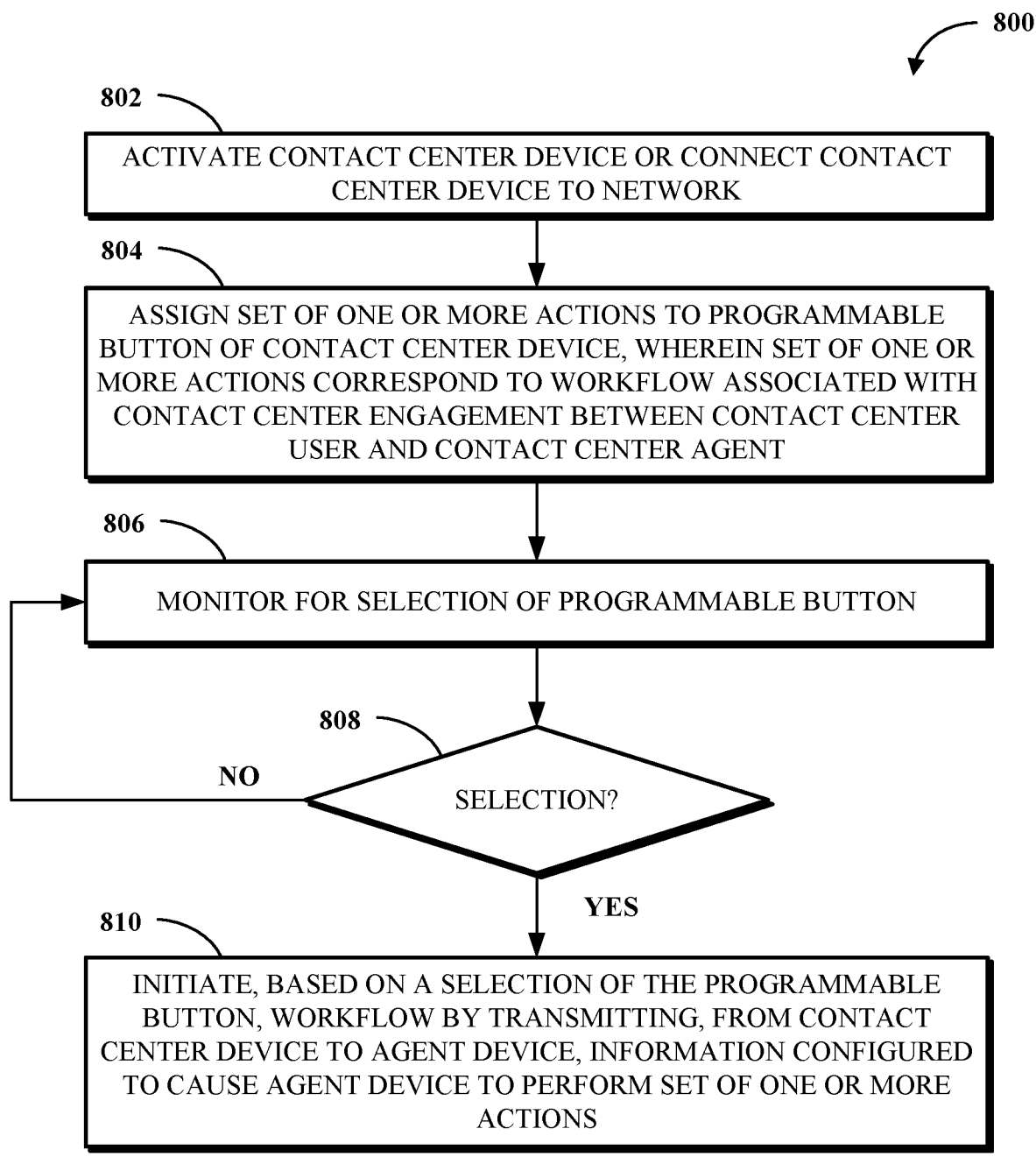
FIG. 8 is a flowchart of an example of a technique for using a programmable contact center device.

To further describe some implementations in greater detail, reference is next made to examples of techniques which may be performed by or using a programmable contact center device. FIG. 8 is a flowchart of an example of a technique 800 for using a programmable contact center device. The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800 or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, a contact center device (e.g., the contact center device 408, the contact center device 508, the first contact center device 608, the second contact center device, or the contact center device 700) may be activated or connected to a network. The contact center device may be connected to an agent device (e.g., the agent device 406, the agent device 506, or the first device 606) or a supervisor device. (e.g., the second device 614). The contact center device may be activated, connected to the network, and/or connected to the agent device automatically via software and/or manually by an agent. The contact center device may be activated, for example, via a power button (e.g., the power button 708) and/or a power interface (e.g., the power interface 710). The contact center device may connect to a server (e.g., the server 404, the server 504, or the server 604) via a network interface (e.g., the network interface 712). The contact center device may connect to an agent device via a communications interface (e.g., the communications interface 714).

At 804, the contact center device may assign a set of one or more actions to a programmable button (e.g., the first programmable button 702 or the second programmable button 704) of the contact center device. The set of one or more actions may correspond to a workflow associated with a contact center engagement between a contact center user and the contact center agent (e.g., initiating payment transactions, transferring calls, transmitting messages, changing a display that is output to one or more monitors, changing a focus of a camera, or changing a video feed). The set of one or more actions may be assigned based on activating the contact center device and/or connecting the contact center device to the network. For example, the set of one or more actions may be assigned by administrative software (e.g., the administrative software 412, the administrative software 512, or the administrative software 612) based on activating the contact center device and/or connecting the contact center device to the network. The administrative software may run locally on the contact center device and/or remotely on the server. In some implementations, the contact center device may assign a set of one or more actions to a controller (e.g., the controller 706, such as a joystick) of the contact center device.

At 806, the contact center device may monitor for a selection of a programmable button. In some implementations, the contact center device may monitor for a selection associated with the controller (e.g., an input to the controller, such as movement of a joystick). The selection could be made by an agent for efficiently performing a workflow (e.g., an agent pressing the button of moving the controller). At 808, a determination is made as to whether a selection is received. If a selection is received ("Yes"), at 810, the contact center device may initiate, based on the selection, the workflow by transmitting, from the contact center device to the agent device, information configured to cause the agent device to perform the set of one or more actions. Otherwise, if a selection is not received ("No"), the contact center device may return to 806 to continue monitoring for a selection (e.g., without initiating a workflow).

Figure 9:
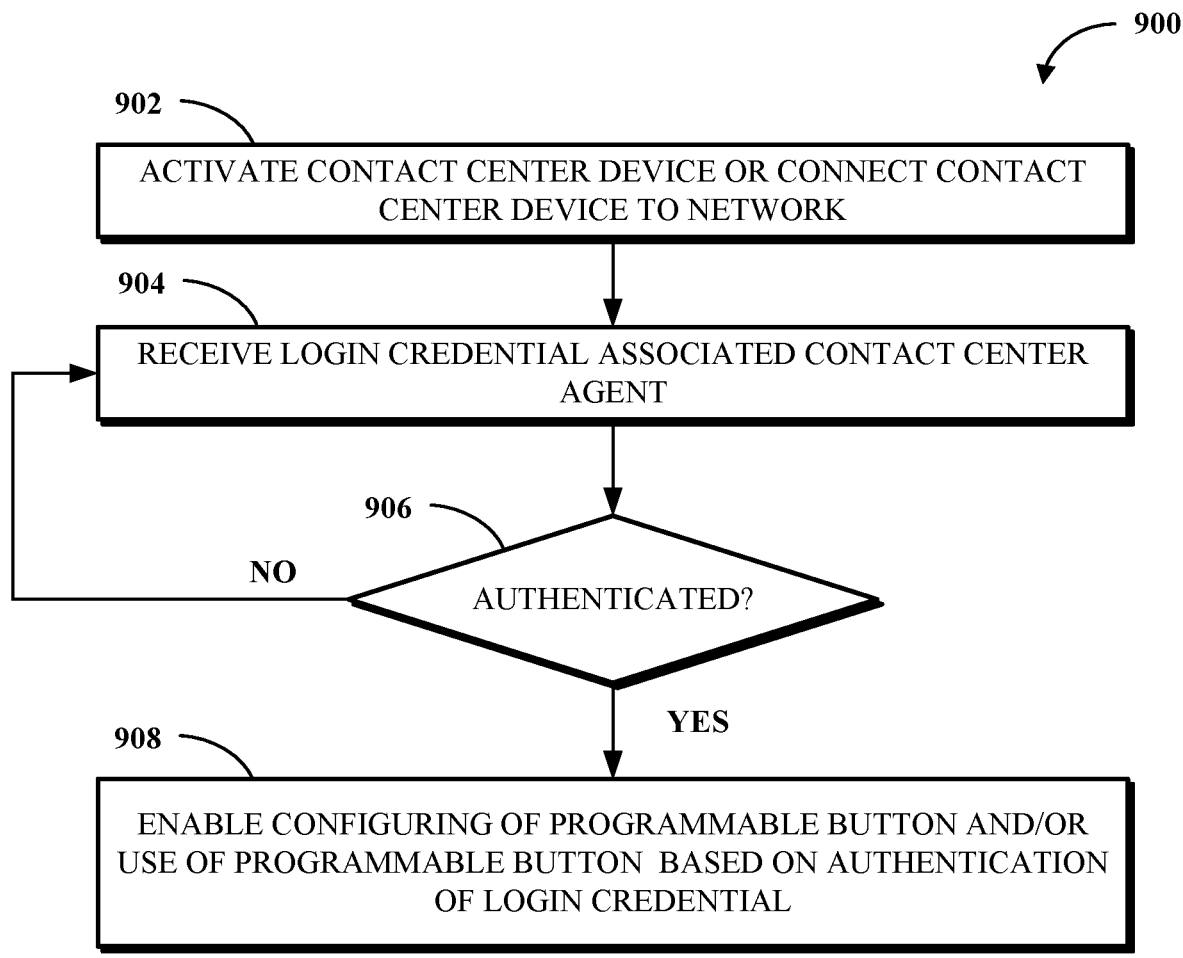
FIG. 9 is a flowchart of an example of a technique for authenticating a login credential using a contact center device.

FIG. 9 is a flowchart of an example of a technique 900 for authenticating a login credential using a contact center device. The technique 900 can be executed using computing devices, such as the systems, hardware, and software described with respect to FIGS. 1-7. The technique 900 can be performed, for example, by executing a machine-readable program or other computer-executable instructions, such as routines, instructions, programs, or other code. The steps, or operations, of the technique 900 or another technique, method, process, or algorithm described in connection with the implementations disclosed herein can be implemented directly in hardware, firmware, software executed by hardware, circuitry, or a combination thereof For simplicity of explanation, the technique 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 902, a contact center device (e.g., the contact center device 408, the contact center device 508, the first contact center device 608, the second contact center device, or the contact center device 700) may be activated or connected to a network. The contact center device may be connected to an agent device (e.g., the agent device 406, the agent device 506, or the first device 606) or a supervisor device. (e.g., the second device 614). The contact center device may be activated, connected to the network, and/or connected to the agent device automatically via software and/or manually by an agent. The contact center device may be activated, for example, via a power button (e.g., the power button 708) and/or a power interface (e.g., the power interface 710). The contact center device may connect to a server (e.g., the server 404, the server 504, or the server 604) via a network interface (e.g., the network interface 712). The contact center device may connect to an agent device via a communications interface (e.g., the communications interface 714).

At 904, the contact center device may receive a login credential associated with a contact center agent. The agent may be linked to the agent device, such as by the login credential also being used to access the agent device. In some implementations, the contact center device may receive the login credential via an access port (e.g., the access port 716). For example, access port may be configured to receive an access card encoded with a login credential. In some cases, the login credential could be entered by the agent via keys or a touch display of the contact center device. The contact center device may include circuitry for analyzing and authenticating or rejecting the login credential.

At 906, the contact center device may determine an authentication or rejection of the login credential. If the login credential is authenticated ("Yes"), at 908, the contact center device may enable configuring programmable buttons and/or a controller of the contact center device (e.g., customization) and/or may enable using the programmable buttons and/or the controller by the agent to initiate a workflow. Otherwise, if the login credential is not authenticated ("No"), or rejected, the contact center device may return to 904 to continue monitoring for a login credential (e.g., without configuring the programmable buttons and/or the controller, and/or without enabling use of the programmable buttons and/or the controller).

Figure 10:
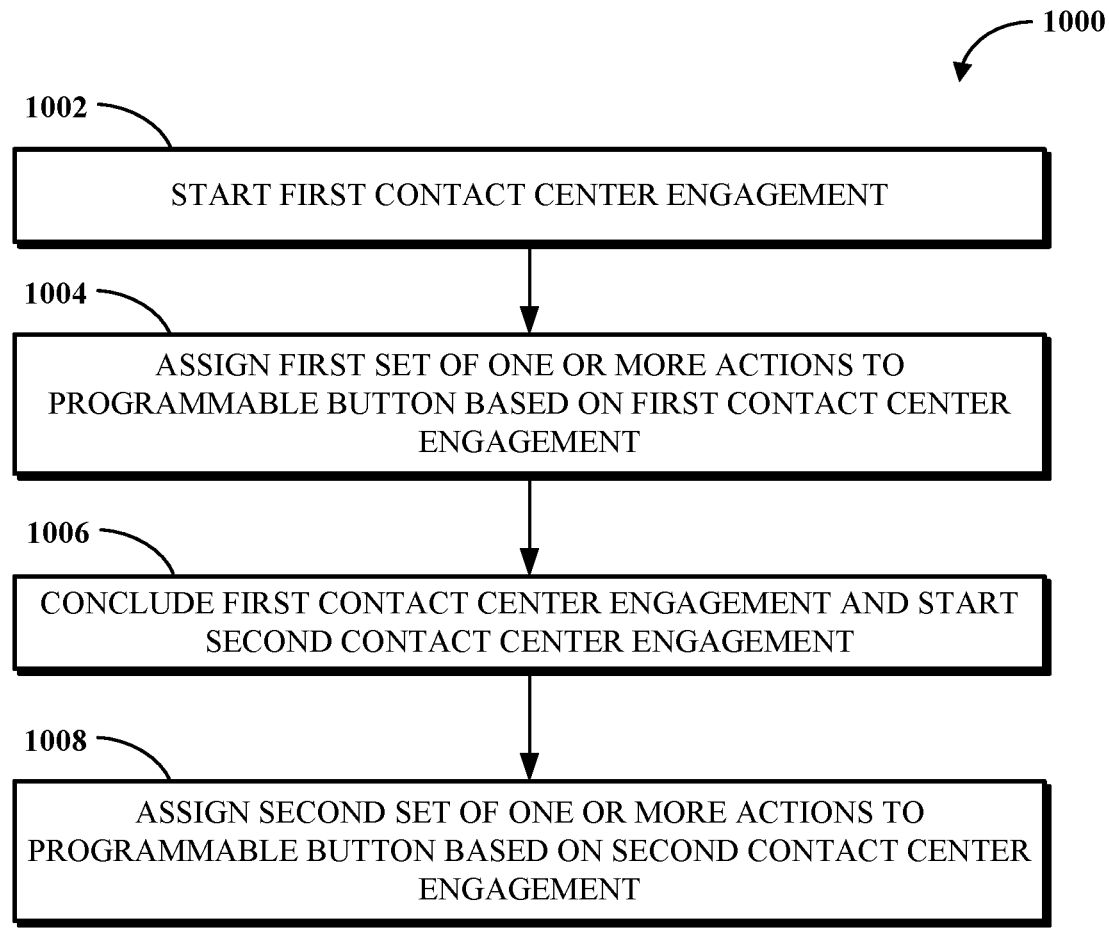
FIG. 10 is a flowchart of an example of a technique for re-assigning a programmable button implemented by a contact center device.

FIG. 10 is a flowchart of an example of a technique 1000 for re-assigning a programmable button implemented by a contact center device. The technique 1000 can be executed using computing devices, such as the systems, hardware, and software described with respect to FIGS. 1-7. The technique 1000 can be performed, for example, by executing a machine-readable program or other computer-executable instructions, such as routines, instructions, programs, or other code. The steps, or operations, of the technique 1000 or another technique, method, process, or algorithm described in connection with the implementations disclosed herein can be implemented directly in hardware, firmware, software executed by hardware, circuitry, or a combination thereof For simplicity of explanation, the technique 1000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1002, a first contact center engagement may be started. The first contact center engagement may be started by communication software (e.g., the communication software 410) implementing the first contact center engagement between a first contact center user using a first user device (e.g., the user device 402) and an agent using an agent device (e.g., the agent device 406). The particular type of communication software used may be based on the modality for the user request resulting in the first contact center engagement. For example, where the user request is for a first contact center engagement over the telephony modality, the communication software may be telephony software. In another example, where the user request is for the first contact center engagement over the video modality, the communication software may be conferencing software. The first contact center engagement may relate to a first issue (e.g., associated with a first question, product, or service).

At 1004, a contact center device, connected to the agent device, may assign a first set of one or more actions to a programmable button (e.g., the first programmable button 702 or the second programmable button 704) of the contact center device. The first set of one or more actions may correspond to a first workflow that is configured for the first contact center engagement (e.g., suited to the first contact center engagement, such as initiating payment transactions, transferring calls, or transmitting messages). For example, the first set of one or more actions may be assigned by administrative software (e.g., the administrative software 412, the administrative software 512, or the administrative software 612) based on the first contact center engagement. The administrative software may run locally on the contact center device and/or remotely on a server (e.g., the server 404, the server 504, or the server 604). In some implementations, the contact center device may assign the first set of one or more actions to a controller (e.g., the controller 706, such as a joystick) of the contact center device.

At 1006, the first contact center engagement may conclude, and a second contact center engagement may be started. The second contact center engagement may be started by the communication software (e.g., the communication software 410) implementing the second contact center engagement between a second contact center user using a second user device, or the first contact center user using the first user device but having a second issue, and the agent using the agent device (e.g., the agent device 406). The particular type of communication software used may be based on the modality for the user request resulting in the second contact center engagement. For example, where the user request is for a second contact center engagement over the telephony modality, the communication software may be telephony software. In another example, where the user request is for the second contact center engagement over the video modality, the communication software may be conferencing software. The second contact center engagement may relate to a second issue (e.g., associated with a second question, product, or service).

At 1008, the contact center device, connected to the agent device, may assign a second set of one or more actions to the programmable button (e.g., the same programmable button) of the contact center device. The second set of one or more actions may correspond to a second workflow that is configured for second first contact center engagement (e.g., suited to the second contact center engagement, such as changing a display that is output to one or more monitors, changing a focus of a camera, or changing a video feed). For example, the second set of one or more actions may be assigned by the administrative software based on the second contact center engagement. In some implementations, the contact center device may assign the second set of one or more actions to the controller (e.g., the same controller) of the contact center device. In some implementations, a prompt may be displayed (e.g., via the agent device) which prompts the agent to accept assigning the second set of one or more actions to the programmable button. The agent may accept or reject assigning the second set of one or more actions to the programmable button via the prompt. As a result, the contact center device may improve the efficiency of first and second contact center engagements.

Some implementations may include a method that includes: assigning a set of one or more actions to a programmable button of a contact center device connected to an agent device of a contact center agent, the set of one or more actions corresponding to a workflow associated with a contact center engagement between a contact center user and the contact center agent, the set of one or more actions being assigned based on at least one of activating the contact center device or connecting the contact center device to a network; and initiating, based on a selection of the programmable button, the workflow by transmitting, from the contact center device to the agent device, information configured to cause the agent device to perform the set of one or more actions. In some implementations, the method may include enabling the programmable button based on an authentication of a login credential associated with the contact center agent. In some implementations, the method may include controlling a digital label of the programmable button to display an indicator to the contact center agent, the indicator corresponding to the workflow. In some implementations, the method may include assigning a second set of one or more actions to a controller of the contact center device, the second set of one or more actions corresponding to a second workflow associated with the contact center engagement. In some implementations, the method may include changing the set of one or more actions to a second set of one or more actions based on a conclusion of the contact center engagement and a start of a second contact center engagement. In some implementations, the workflow may include changing at least one of: a display that is output to one or more monitors associated with the agent device; a focus of a camera associated with the agent device; or a video feed, transmitted to a user device of the contact center user, from a first camera to a second camera. In some implementations, the programmable button may be lit with a first color based on a first configuration of the programmable button corresponding to the workflow and with a second color based on a second configuration of the programmable button corresponding to a second workflow. In some implementations, the method may include assigning a set of one or more actions to a programmable button of a second contact center device connected to a supervisor device of a contact center supervisor, the set of one or more actions corresponding to a second workflow associated with the contact center engagement between the contact center user and the contact center agent; and initiating, based on a selection of the programmable button of the second contact center device, the second workflow by transmitting, from the second contact center device to the supervisor device, information configured to cause the supervisor device to perform the set of one or more actions.

Some implementations may include a contact center device that includes: a memory; a programmable button; and a processor configured to execute instructions stored in the memory to: assign a set of one or more actions to the programmable button of the contact center device, the set of one or more actions corresponding to a workflow associated with a contact center engagement between a contact center user and the contact center agent, the set of one or more actions being assigned based on at least one of activating the contact center device or connecting the contact center device to a network; and initiate, based on a selection of the programmable button, the workflow by transmitting, from the contact center device to the agent device, information configured to cause the agent device to perform the set of one or more actions. In some implementations, the processor may be further configured to execute instructions stored in the memory to: enable the programmable button based on an authentication of a login credential received via an access port of the of the contact center device. In some implementations, the contact center device may include a display system configured to control a digital label of the programmable button to display an indicator to the contact center agent, the indicator corresponding to the workflow. In some implementations, the contact center device may include a joystick, wherein the processor is further configured to execute instructions stored in the memory to assign a second set of one or more actions to the joystick of the contact center device, the second set of one or more actions corresponding to a second workflow associated with the contact center engagement. In some implementations, the processor may be further configured to execute instructions stored in the memory to: change the set of one or more actions to a second set of one or more actions based on a conclusion of the contact center engagement and a start of a second contact center engagement. In some implementations, the workflow may include at least one of: initiating a payment transaction; or transmitting a message or knowledgebase article to the user device. In some implementations, the contact center device may include a display system configured to light the programmable button with a first color based on a first configuration of the programmable button corresponding to the workflow and with a second color based on a second configuration of the programmable button corresponding to a second workflow.

Some implementations may include a non-transitory computer readable medium storing instructions operable to cause one or more processors to perform operations that include: assigning a set of one or more actions to a programmable button of a contact center device connected to an agent device of a contact center agent, the set of one or more actions corresponding to a workflow associated with a contact center engagement between a contact center user and the contact center agent, the set of one or more actions being assigned based on at least one of activating the contact center device or connecting the contact center device to a network; and initiating, based on a selection of the programmable button, the workflow by transmitting, from the contact center device to the agent device, information configured to cause the agent device to perform the set of one or more actions. In some implementations, the operations may further include enabling the programmable button based on an authentication of a login credential associated with the contact center agent. In some implementations, the operations may further include controlling a digital label of the programmable button to display an indicator to the contact center agent, the indicator corresponding to the workflow. In some implementations, the operations may further include assigning a second set of one or more actions to a joystick of the contact center device, the second set of one or more actions corresponding to a second workflow associated with the contact center engagement. In some implementations, the operations may further include changing the set of one or more actions to a second set of one or more actions based on a conclusion of the contact center engagement and a start of a second contact center engagement.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
  assigning a set of one or more actions to a programmable button of a contact center device connected to an agent device of a contact center agent, the set of one or more actions corresponding to a workflow associated with a contact center engagement between a contact center user and the contact center agent, the set of one or more actions being assigned based on at least one of activating the contact center device or connecting the contact center device to a network; and
  initiating, based on a selection of the programmable button, the workflow by transmitting, from the contact center device to the agent device, information configured to cause the agent device to perform the set of one or more actions.

2. The method of claim 1, further comprising:
  enabling the programmable button based on an authentication of a login credential associated with the contact center agent.

3. The method of claim 1, further comprising:
  controlling a digital label of the programmable button to display an indicator to the contact center agent, the indicator corresponding to the workflow.

4. The method of claim 1, further comprising:
  assigning a second set of one or more actions to a controller of the contact center device, the second set of one or more actions corresponding to a second workflow associated with the contact center engagement.

5. The method of claim 1, further comprising:
  changing the set of one or more actions to a second set of one or more actions based on a conclusion of the contact center engagement and a start of a second contact center engagement.

6. The method of claim 1, wherein the workflow includes changing at least one of:
  a display that is output to one or more monitors associated with the agent device;
  a focus of a camera associated with the agent device; or
  a video feed, transmitted to a user device of the contact center user, from a first camera to a second camera.

7. The method of claim 1, wherein the programmable button is lit with a first color based on a first configuration of the programmable button corresponding to the workflow and with a second color based on a second configuration of the programmable button corresponding to a second workflow.

8. The method of claim 1, further comprising:
  assigning a set of one or more actions to a programmable button of a second contact center device connected to a supervisor device of a contact center supervisor, the set of one or more actions corresponding to a second workflow associated with the contact center engagement between the contact center user and the contact center agent; and
  initiating, based on a selection of the programmable button of the second contact center device, the second workflow by transmitting, from the second contact center device to the supervisor device, information configured to cause the supervisor device to perform the set of one or more actions.

9. A contact center device, comprising:
  a memory;
  a programmable button; and
  a processor configured to execute instructions stored in the memory to:
  assign a set of one or more actions to the programmable button of the contact center device, the set of one or more actions corresponding to a workflow associated with a contact center engagement between a contact center user and a contact center agent, the set of one or more actions being assigned based on at least one of activating the contact center device or connecting the contact center device to a network; and
  initiate, based on a selection of the programmable button, the workflow by transmitting, from the contact center device to an agent device of the contact center agent, information configured to cause the agent device to perform the set of one or more actions.

10. The contact center device of claim 9, wherein the processor is further configured to execute instructions stored in the memory to:
  enable the programmable button based on an authentication of a login credential received via an access port of the of the contact center device.

11. The contact center device of claim 9, further comprising:
  a display system configured to control a digital label of the programmable button to display an indicator to the contact center agent, the indicator corresponding to the workflow.

12. The contact center device of claim 9, further comprising:
  a joystick, wherein the processor is further configured to execute instructions stored in the memory to assign a second set of one or more actions to the joystick of the contact center device, the second set of one or more actions corresponding to a second workflow associated with the contact center engagement.

13. The contact center device of claim 9, wherein the processor is further configured to execute instructions stored in the memory to:
  change the set of one or more actions to a second set of one or more actions based on a conclusion of the contact center engagement and a start of a second contact center engagement.

14. The contact center device of claim 9, wherein the workflow includes at least one of:
- initiating a payment transaction; or
- transmitting a message or knowledgebase article to a user device.

15. The contact center device of claim 9, further comprising:
- a display system configured to light the programmable button with a first color based on a first configuration of the programmable button corresponding to the workflow and with a second color based on a second configuration of the programmable button corresponding to a second workflow.

16. A non-transitory computer readable medium storing instructions operable to cause one or more processors to perform operations comprising:
- assigning a set of one or more actions to a programmable button of a contact center device connected to an agent device of a contact center agent, the set of one or more actions corresponding to a workflow associated with a contact center engagement between a contact center user and the contact center agent, the set of one or more actions being assigned based on at least one of activating the contact center device or connecting the contact center device to a network; and
- initiating, based on a selection of the programmable button, the workflow by transmitting, from the contact center device to the agent device, information configured to cause the agent device to perform the set of one or more actions.

17. The non-transitory computer readable medium storing instructions of claim 16, the operations further comprising:
- enabling the programmable button based on an authentication of a login credential associated with the contact center agent.

18. The non-transitory computer readable medium storing instructions of claim 16, the operations further comprising:
- controlling a digital label of the programmable button to display an indicator to the contact center agent, the indicator corresponding to the workflow.

19. The non-transitory computer readable medium storing instructions of claim 16, the operations further comprising:
- assigning a second set of one or more actions to a joystick of the contact center device, the second set of one or more actions corresponding to a second workflow associated with the contact center engagement.

20. The non-transitory computer readable medium storing instructions of claim 16, the operations further comprising:
- changing the set of one or more actions to a second set of one or more actions based on a conclusion of the contact center engagement and a start of a second contact center engagement.

* * * * *